United States Patent
S (10) Patent No.: US 11,775,365 B1
(45) Date of Patent: Oct. 3, 2023

(54) EFFICIENT MONITORING DATA COLLECTION AND DISTRIBUTION

(71) Applicant: SAP SE, Walldorf (DE)

(72) Inventor: Anbusivam S, Bangalore (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/838,554

(22) Filed: Jun. 13, 2022

(51) Int. Cl.
*G06F 9/44* (2018.01)
*G06F 9/54* (2006.01)

(52) U.S. Cl.
CPC .............. *G06F 9/547* (2013.01); *G06F 9/546* (2013.01)

(58) Field of Classification Search
CPC ....................................................... G06F 9/547
USPC ........................................................ 719/313
See application file for complete search history.

(56) References Cited

U.S. PATENT DOCUMENTS

| 10,984,017 B1* | 4/2021 | Gilderman | .......... G06F 16/2379 |
| 2020/0344109 A1* | 10/2020 | Shil | ...................... H04L 41/0233 |
| 2021/0120039 A1* | 4/2021 | Bett | ..................... G06F 11/1461 |

* cited by examiner

*Primary Examiner* — Timothy A Mudrick
(74) *Attorney, Agent, or Firm* — SCHWEGMAN LUNDBERG & WOESSNER, P.A.

(57) ABSTRACT

In an example embodiment, a cross-tenant service broker with a router microservice is introduced. The router microservice writes information into the service broker. A data receiver then reads the information from the service broker and stores it in tenant specific storage. A distributer forwards data that belongs to other data centers. In each tenant, data center information is received as part of an application program interface (API). In order to address the fact that the tenancy model of a MAP and a MLAP may be different, a service registry (or service landscape registry, such as SLIS or LIS) kernel service is used to map the MLAP tenant(s) into the correct MAP tenant(s).

20 Claims, 5 Drawing Sheets

EFFICIENT MONITORING DATA COLLECTION AND DISTRIBUTION

TECHNICAL FIELD

This document generally relates to microservice software environments. More specifically, this document relates to efficient monitoring data collection and distribution in a distributed environment.

BACKGROUND

Microservices are small, independent software processes that can be written in multiple languages. An infrastructure designed for these modular components is known as a microservices environment or microservices architecture. Cloud environments may be used to implement microservices environments. An example of a microservices environment is SAP Cloud Platform® Extension Manager, from SAP SE of Walldorf, Germany. Another example is Cloud Application Lifecycle Management (CALM)®, from SAP SE of Walldorf, Germany.

BRIEF DESCRIPTION OF DRAWINGS

The present disclosure is illustrated by way of example and not limitation in the figures of the accompanying drawings, in which like references indicate similar elements.

DETAILED DESCRIPTION

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

Microservices are often deployed in data centers. A data center is a dedicated location used to house computer systems and associated components. A cloud lifecycle management component (e.g., CALM) gives users the ability to actively participate in cloud implementation projects for applications they wish to deploy. More generally, a CALM or similar component may be known as a monitoring application provider (MAP), and acts to monitor application lifecycles in a cloud environment. This monitoring can take many forms, such as integration monitoring (monitoring among different instances of the same application), health monitoring (monitoring network health), job monitoring (monitoring execution of computing jobs), exception monitoring (monitoring exceptions triggered by execution of computing jobs), etc.

A monitored line-of-business application provider (MLAP), such as SuccessFactors™, Ariba®, or other managed cloud service providers), hosts the actual applications running in a cloud environment, which are being monitored by the MAP(s).

A technical issue arises in the use of MAPs and MLAPS in a cloud environment. Specifically, in a cloud environment, a MAP may be running in multiple data centers, and may each host multiple tenants that belong to multiple customers with the same provider. An MLAP may also host multiple tenants of its own, that belong to multiple customers. The tenants of the MLAPs (known as customer application tenants) also can span across multiple data centers. Therefore, a customer may have multiple MLAP tenants belonging to different data centers, and the number of MAP tenants may differ from the number of MLAP tenants, as often customers choose to monitor most of the tenants using fewer (or a single) MAP tenant. Providing an efficient way of monitoring a customer landscape in such a distributed environment with a distributed MAP is often tricky.

More particularly, from the technical point of view, a solution would need to collect and distribute data between different MLAP instances where MLAP is in one data center, even when the customer chooses to monitor using a MAP tenant in another data center, would need to collect data from a MLAP which is multi-tenant (same provider application that hosts more than one customer's tenant, and would need to map an MLAP customer tenant to a MAP tenant, based on a customer's choice of which tenants of the MLAP should be monitored by which tenant of the MAP, and in which data center.

One solution would be to have the customer connect MLAP and MAP tenants via a point-to-point interface. There are technical issues with such a solution, however. Specifically, such a solution would need an explicit connectivity from the customer, which may not be available. It would also need calls to be performed at a tenant level, which increases the number of calls from MLAP to MAP by many degrees. Lastly, the latency of each call increases as the network distance between the MLAP and MAP increases, which is quite possible for data centers in geographically disparate locations, thus making the "cost" (in time) of each call significant enough that reducing the number of calls becomes important, if not outright necessary, to operate efficiently.

In an example embodiment, a cross-tenant service broker (or any other component capable of authenticating at cross tenant level, i.e. provider level) with a router microservice is introduced. The router microservice writes information into the message broker. A data receiver then reads the information from the message broker and stores it in a tenant specific storage. A distributer forwards data that belongs to other data centers. In each tenant, data center information is received as part of an application program interface (API). In order to address the fact that the tenancy model of a MAP and a MLAP may be different, a service registry (or service landscape registry, such as SLIS or LIS) kernel service is used to map the MLAP tenant(s) into the correct MAP tenant(s).

Figure 1:
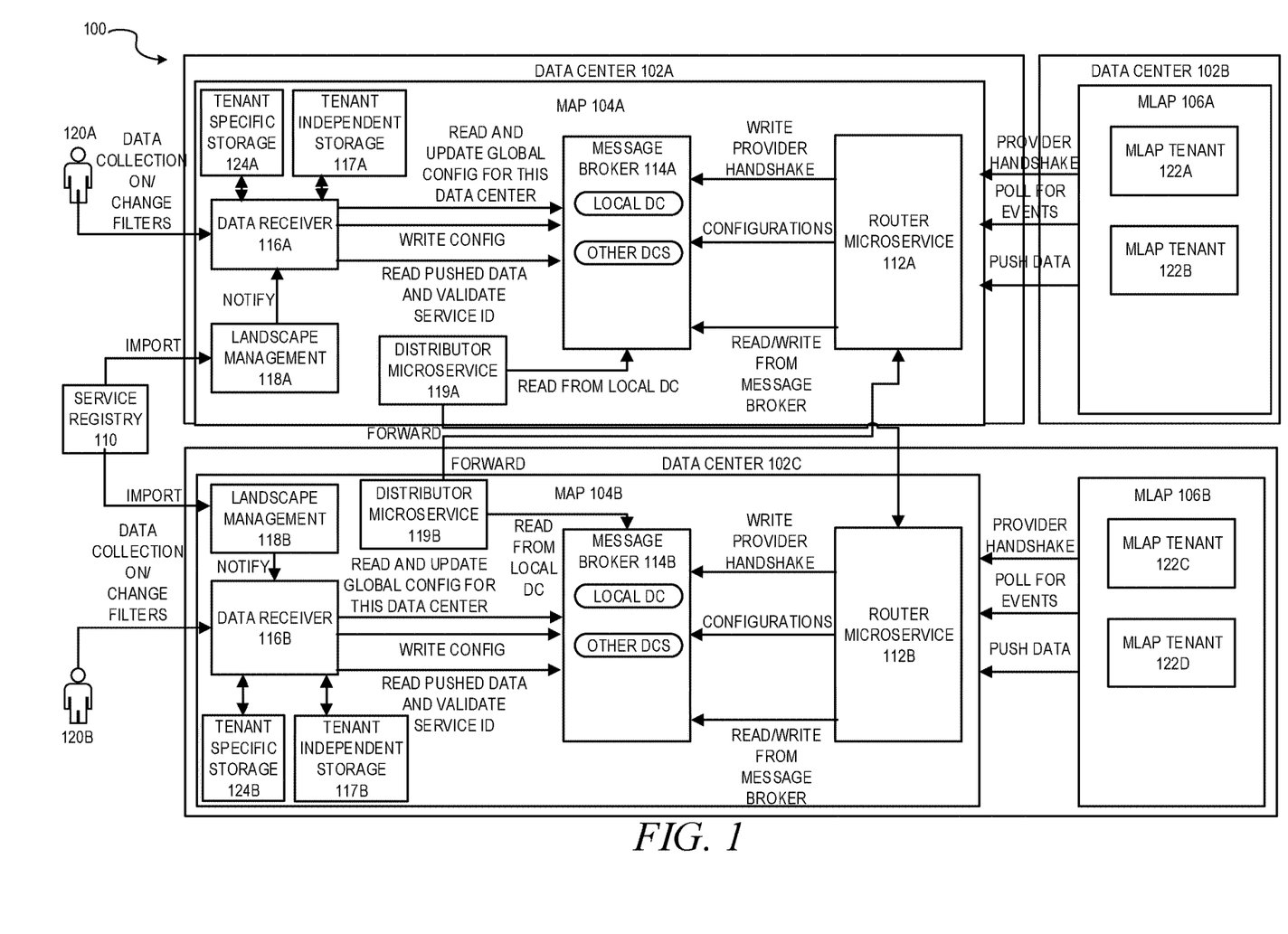
FIG. 1 is a block diagram illustrating a system 100 in accordance with an example embodiment.

FIG. 1 is a block diagram illustrating a system 100 in accordance with an example embodiment. Here, three distributed data centers 102A, 102B, 102C are provided. These distributed data centers 102A, 102B, 102C can either be physically distinct data centers (e.g., located geographically apart from one another) or logically distinct data centers (e.g., not necessarily located geographically apart from one another). While the presently described techniques can be applied to either type of data center distribution mechanism, many of the technical advantages of the presently described techniques apply mostly to data centers located geographically apart from one another by a significant distance.

Data center 102A contains MAP 104A while data center 102B contains MLAP 106A. Thus, this depicts how an MLAP 106A may be located on a different data center 102B than the MAP 104A it needs to communicate with. Data center 103C contains both MAP 104B and MLAP 106B. Thus, this depicts how the MLAP 106B may alternatively be located on a same data center 102C as the MAP 104B it needs to communicate with.

MLAP 106A contains MLAP tenants 122A, 122B, while MLAP 106B contains MLAP tenants 122C, 122D. While not pictured, both MLAP 106A and MLAP 106B act to align the tenant identifier for their respective tenants 122A-122D with tenant identifiers in a service registry 110, which stores information about all the customer tenants of each customer of all the MLAPs 106A, 106B in the system 100. This means that the MLAPs 106A and 106B use a naming convention for the tenant identifiers that is the same as the service registry 110 uses. This alignment may be accomplished in a number of different ways. One way would be for the MLAPs 106A, 106B to query the service registry 110 for the actual tenant identifiers used. Another would be for the MLAPs 106A, 106B to be programmed to use the same naming convention as the service registry 110, eliminating the need for the MLAPs 106A, 106B to communicate with the service registry 110.

Each MLAP 106A, 106B issues a handshake to the corresponding MAP 104A, 104B, respectively, it wishes to communicate with. This handshake allows the MAP 104A, 104B to know which of the tenants belong to the provider in question. More particularly, this handshake is between the MLAP 106A, 106B and a router microservice 112A, 112B, respectively, on the corresponding MAP 104A, 104B. The router microservice 112A, 112B then writes this provider handshake to all data centers by writing it to a corresponding message broker 114A, 114B, respectively (using both a local data center topic and an "other" data center topic).

When a message is posted to such a topic, the distributor listening to the message broker 114A, 114B then transmits that message to a corresponding local or remote data center. For a local data center, a data receiver 116A, 116B within the same data center 102A, 102C listens for the local data center topic and reads and updates a global configuration based on the details posted to it. Doing so may make use of a local cache, for example a cache stored in tenant independent storage 117A, 117B.

Then, a landscape management component 118A, 118B imports a system landscape registry from the service registry 110. This system landscape registry can then be updated to the corresponding data receivers 116A, 116B.

End users 120A, 120B (such as customers) can then log on to a corresponding MAP 104A, 104B in a corresponding data center 102A, 102C and view a monitoring console containing a list of all the tenants in their landscape that belongs to various MLAPs. The end user 120A, 120B can then switch on data collection for a particular tenant. The end user 120A, 120B can also make other changes to the configuration, like changing a filter parameter. A filter parameter is a configuration that tells the MLAP 106A, 106B what data for the customer tenant it needs to send to the corresponding MAP 104A, 104B. This can be used to reduce the amount of data flowing from the MLAP 106A, 106B to the corresponding MAP 104A, 104B.

The configuration can also be written into the corresponding message broker 114A, 114B with a key such as (data center, MAP tenant ID, MLAP tenant ID), with the message content including the filters that have changed or whether data collection(monitoring) is active or not. Respective topics "local dcs" or "other dcs" are used while writing the configuration into the message broker by data receiver microservices 116A, 116B depending on which MAP datacenter the MLAP that needs to receive the configuration is connected to. Distributer 119A, 119B identifies the other-dc topics and forwards respectively to the router 112B and 112A. Router 112A & 112B identifies the received information from distributer 119B & 119A respectively and writes it to the local dc topic in that datacenter.

Each MLAP 106A, 106B polls the corresponding router microservice 112A, 112B in the corresponding MAP 104A, 104B to determine whether there are any notifications available for it. The router microservice 112A identifies the local topic and serves it to MLAP 106A during poll for events and similarly router 112B serves it to MLAP 106B during poll for events.

Each MAP 104A, 104B may contain multiple tenants 122A, 122B, 122C, 122D. Likewise, while not pictured here, each MAP 104A, 104B may also have multiple tenants, and those tenants may be different than the tenants 122A-122D in the MLAPs 106A, 106B. This is what adds to the complexity that the system 100 handles, through the use of the router microservices 112A, 112B, distributor microservices 119A, 119B and message brokers 114A, 114B.

It should be noted that the distribution of messages via the message brokers 114A, 114B may come in two different models: push and pull. In the push model, the MLAP 106A, 106B pushes information to the router microservice 112A, which pushes that information to the message broker 114A, 114B, which then triggers distribution of the information to the distributor microservices 119A, 119B. In the pull model, the distributor microservices 119A, 119B request the information from the message broker 114A, 114B (via a "pull" call), which then obtains the information from the router microservice 112A, 112B (which further pulls it from the MLAPs 106A, 106B.

Each data receiver 116A, 116B, now in possession of the monitoring information from the MLAPs 106A, 106B, as well as the information from the service registry 110 and the data collection and filter parameters from the end users 120A, 120B, is able to decide which of the monitoring information to store in tenant-specific storage 124A, 124B. It should be noted that while in this figure a single tenant-specific storage 124A, 124B is depicted for each MAP 104A, 104B; in actuality, there would be a different tenant-specific storage 124A, 124B for each tenant in each MAP 104A, 104B.

Figure 2:
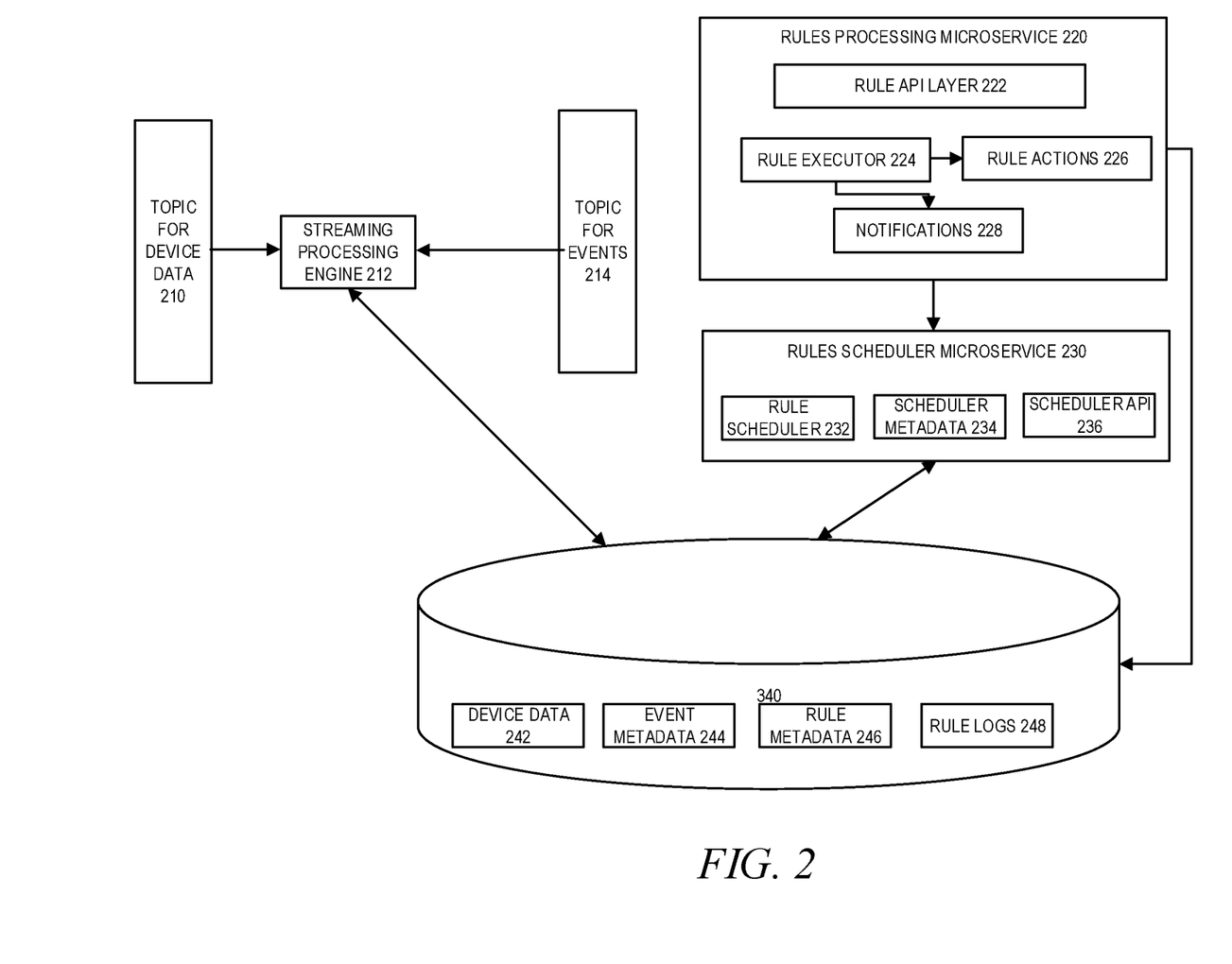
FIG. 2 is a diagram illustrating an example message broker 114A, 114B, in accordance with an example embodiment.

FIG. 2 is a diagram illustrating an example message broker 114A, 114B of FIG. 2, in accordance with an example embodiment. This message broker 114A, 114B may be a distributed messaging system, such as Kafka, which provides fast, highly scalable, and redundant messaging through a publish-subscribe model. In a publish-subscribe model, asynchronous communication technology is used such that any message published to a topic is eventually received by all subscribers to the topic. Other desirable attributes of such a messaging system include allowing a large number of permanent or ad-hoc nodes while, at the same time, being highly available and resilient to node failures and supporting automatic recovery.

The messages can be organized into topics 210 for each device. Such device data topics can be divided into a number of partitions that allow the topic to be parallelized by splitting the corresponding topic across multiple brokers (which can be on different physical computing devices). Such topic data can be processed by a stream processing engine 212, such as a Spark streaming engine which takes the device data and generates topics for events 214. Stated differently, the raw device data is converted by the stream processing engine 212 into topics characterizing events identified within such raw device data. The streaming processing engine 212 can access a database 240 to store, access, or modify data therein relating to device data 242, event metadata 244, rule metadata 246, and/or rule logs 248. Whenever a new rule is created, the rule engine stores this metadata information. The information contains the rules, conditions, and the information about the objects on which this rule is defined.

The messages within the topic for events 214 can be consumed by a rules processing microservice 220. Such messages are accessed initially via a rule API layer 222. A rule executor 224 determines which rules to execute and whether rule actions 226 can be initiated. Further, notifications 228 regarding the execution of such rules can be provided (e.g., displayed on an electronic visual display, transmitted to a remote computing device, loaded into memory, stored in physical persistence, etc.). This rule action could also be sending emails, invoking external APIs, and storing the result in database.

A rules scheduler microservice 230 can be provided to determine when to execute particular rules. A rules scheduler 232 can define when certain rules are triggered and/or valid. Various metadata 234 characterizing the scheduling can be defined, and a scheduler API 236 can provide an interface with the database 240 and/or the rules processing microservice 220.

It should be noted that it is not mandatory that the message broker 114A, 114B follow a publish-subscribe model, and example embodiments exist where the message broker 114A, 114B uses a different asynchronous communications model. Since the message broker transactions are asynchronous, the result is that asynchronous communication can be achieved over distributed data centers despite using protocols typically used for synchronous communications, such as HTTP.

In a further example embodiment, the topic names utilized do more than distinguish between topics for local consumption (messages within the same data center) or non-local consumption (messages between different data centers). Specifically, they may further segregate based on use case or similar functionality. In this way, a microservice need not use a "real" topic name but instead could use the use case name. This is useful in situations where the microservice may not be aware of an actual topic name, or is aware of the topic name used on its own data center but a similar topic on another data center has a different name. A reusable utility may be used to derive the actual topic name based on a combination of the specified use-case, landscape, and data center. In some example embodiments, the actual topic name may be derived further based on a combination of the use-case, landscape, data center, and purpose.

In order to set up a message flow between a sender microservice and a receiver microservice, first it is determined what the use case name was that the receiver microservice(s) listened to. A logic may be present to determine which data center each message in the message flow needs to be sent to.

If the receiver microservice is not in the same data center as the sender microservice, then a topic name is created with a combination of a constant identifier (to denote it is intended for a distributor to pick up), a data center name, a location of a sender application or landscape name (with space name, landscape name could be derived from the landscape configuration), and optionally, a use case name. In some cases, having fewer numbers of topics increases the efficiency of the distributor, and thus, in that case, the use case name can be used in the message header instead of the topic name. An example topic name is as follows "template ds.<space>.<targetdatacenter>. Here, "ds" denotes that the distributor should pick this up.

If the receiver microservice is in the same data center as the sender microservice, then a topic name is created with a combination of a constant identifier (to denote that it is intended for the receiver microservice to pick up), a location of a sender application or landscape name, and a use case name. An example topic name is as follows "template ms.<space>.<usecase>. Here ms denotes that it is meant for the receiver microservice to pick up.

The distributor derives the list of topics by listening to the message broker and obtaining the list of data centers, use cases, and space names from the landscape configuration. From the message, the target data center, use case, and location are obtained. The location may be used to derive the landscape from the landscape configuration.

The distributor then gets the destination for the use case location, landscape, and data center from the landscape configuration. It then calls the URL or any other callable endpoint in the destination, using details such as use case, landscape, and target data center. It finally reaches the router in the receiver's data center.

The router receives a request and interprets details such as use case, landscape, target data center, etc., which can be part of the call in some way, such as in the header, body, URL or endpoint path, or query parameters. The logic at the router is the same as of a sender microservice. Namely, if it is located in the target data center, then it writes to a topic which is similar to the sender logic in its topic name (ms.<space>.<usecase>). If it is not in the current data center, it writes it to the topic name using the sender logic (ds.<space>.<usecase>). Based on the topic name, either a microservice in the data center or the distributor in the data center will pick it up.

The receiver microservice listens to a topic name based on a combination of use case, use case location (which is the current receiver's location), and a constant indicating the receiver microservice is a recipient. As the receiver microservice can get the use case space from the environment, it need not typically read the landscape configuration.

Figure 3:
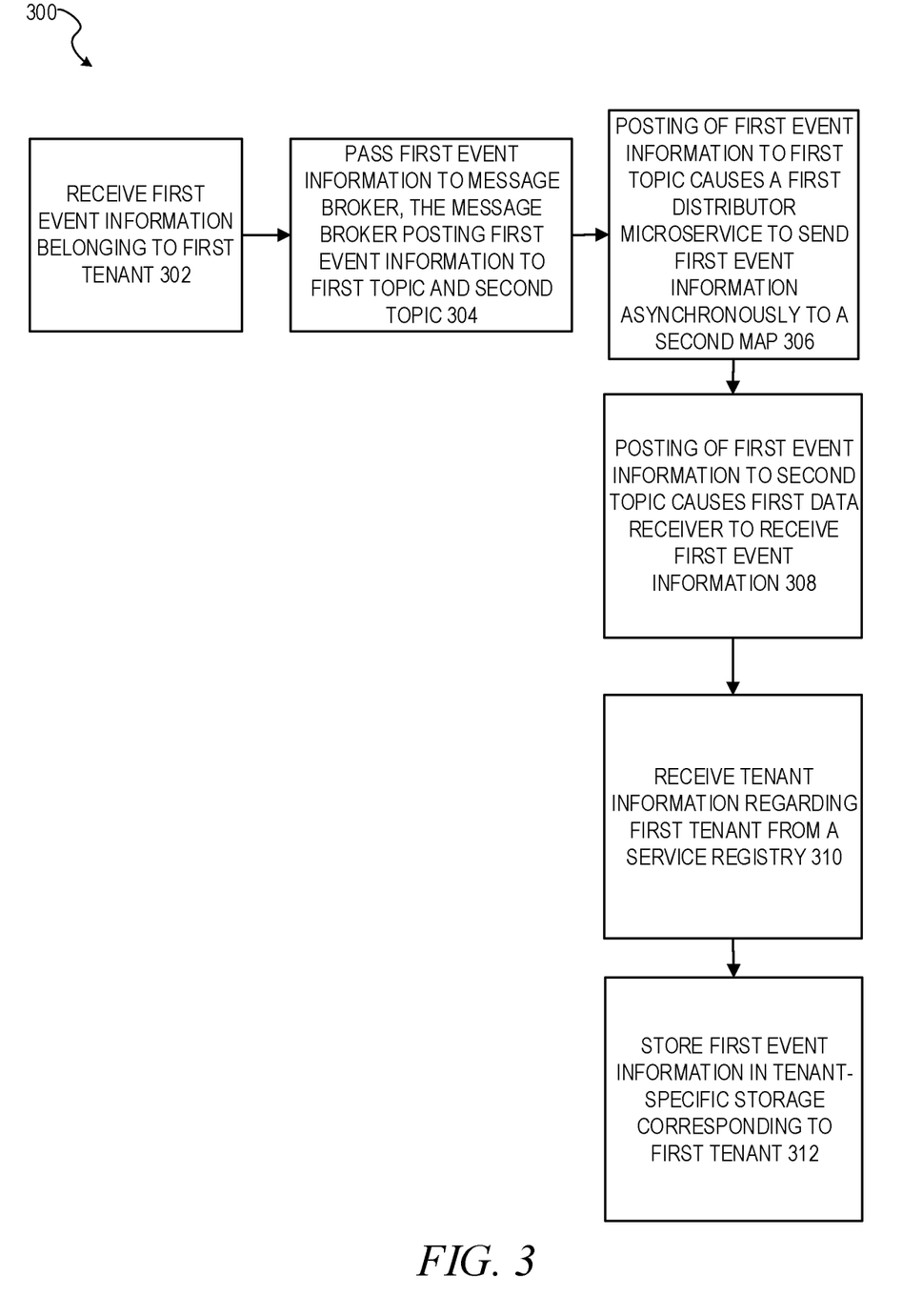
FIG. 3 is a flow diagram illustrating a method 300 for efficient monitoring data collection and distribution, in accordance with an example embodiment.

FIG. 3 is a flow diagram illustrating a method 300 for efficient monitoring data collection and distribution, in accordance with an example embodiment. The method 300 may be performed at a first MAP located at a first data center. At operation 302, a first router microservice in the first MAP receives first event information regarding events occurring in an instance of a first monitored application provider belonging to a first tenant. At operation 304, the first event information is passed to a first message broker in the first MAP, the first message broker posting the first event information to a first topic and to a second topic. At operation 306, the posting of the first event information to the first topic causes a first distributor microservice in the first monitoring application to send the first event information asynchronously to a second router microservice in a second MAP located in a second data center. At operation 308, the posting of the first event information to the second topic causes a first data receiver in the first MAP to receive the first event information.

At operation 310, the first data receiver receives tenant information regarding the first tenant from a service registry. At operation 312, the first data receiver stores the first event information in a tenant-specific storage corresponding to the first tenant, in the first MAP, based on the tenant information.

In view of the disclosure above, various examples are set forth below. It should be noted that one or more features of an example, taken in isolation or combination, should be considered within the disclosure of this application.

Example 1. A system comprising:

at least one hardware processor; and
a computer-readable medium storing instructions that, when executed by the at least one hardware processor, cause the at least one hardware processor to perform operations comprising:
  receiving, at a first router microservice in a first monitoring application provider (MAP) located at a first data center, first event information regarding events occurring in an instance of a first monitored application provider belonging to a first tenant;
  passing the first event information to a first message broker in the first MAP, the first message broker posting the first event information to a first topic and to a second topic;
  the posting of the first event information to the first topic causing a first distributor microservice in the first monitoring application to send the first event information asynchronously to a second router microservice in a second MAP located in a second data center;
  the posting of the first event information to the second topic causing a first data receiver in the first MAP to receive the first event information;
  obtaining, by the first data receiver, tenant information regarding the first tenant from a service registry; and
  storing, by the first data receiver, the first event information in a tenant-specific storage corresponding to the first tenant, in the first MAP, based on the tenant information.

Example 2. The system of Example 1, wherein the first monitored application provider is a monitored line of business application provider (MLAP).

Example 3. The system of Examples 1 or 2, wherein the instance of the first monitored application provider is located at a third data center.

Example 4. The system of Example 3, wherein the first data center is located at a geographically distant location to the third data center.

Example 5. The system of any of Examples 1-4, wherein the first data center is located at a geographically distant location to the second data center.

Example 6. The system of any of Examples 1-5, wherein the operations further comprise:

receiving, at the first router microservice in a first monitoring application provider (MAP), located at a first data center, from a second distributor microservice in the second MAP, second event information regarding events occurring in an instance of a second monitored application provider belonging to a second tenant;
passing the second event information to the first message broker, the first message broker posting the second event information to the second topic;
the posting of the second event information to the second topic causing the first data receiver to receive the first event information; and storing, by the first data receiver, the second event information in a tenant-specific storage corresponding to the second tenant, in the first MAP, based on the tenant information.

Example 7. The system of any of Examples 1-6, further comprising:

accessing, by the data receiver, one or more filters provided by an end user, wherein the storing includes storing only a filtered version of the first event information based on the one or more filters provided by the end user.

Example 8. A method comprising:

receiving, at a first router microservice in a first monitoring application provider (MAP) located at a first data center, first event information regarding events occurring in an instance of a first monitored application provider belonging to a first tenant;
passing the first event information to a first message broker in the first MAP, the first message broker posting the first event information to a first topic and to a second topic;
the posting of the first event information to the first topic causing a first distributor microservice in the first monitoring application to send the first event information asynchronously to a second router microservice in a second MAP located in a second data center;
the posting of the first event information to the second topic causing a first data receiver in the first MAP to receive the first event information;
obtaining, by the first data receiver, tenant information regarding the first tenant from a service registry; and storing, by the first data receiver, the first event information in a tenant-specific storage corresponding to the first tenant, in the first MAP, based on the tenant information.

Example 9. The method of Example 8, wherein the first monitored application provider is a monitored line of business application provider (MLAP).

Example 10. The method of Examples 8 or 9, wherein the instance of the first monitored application provider is located at a third data center.

Example 11. The method of Example 10, wherein the first data center is located at a geographically distant location to the third data center.

Example 12. The method of any of Examples 8-11, wherein the first data center is located at a geographically distant location to the second data center.

Example 13. The method of any of Examples 8-12, wherein the operations further comprise:

receiving, at the first router microservice in a first monitoring application provider (MAP) located at a first data center, from a second distributor microservice in the second MAP, second event information regarding events occurring in an instance of a second monitored application provider belonging to a second tenant;
passing the second event information to the first message broker, the first message broker posting the second event information to the second topic;
the posting of the second event information to the second topic causing the first data receiver to receive the first event information; and
storing, by the first data receiver, the second event information in a tenant-specific storage corresponding to the second tenant, in the first MAP, based on the tenant information.

Example 14. The method of any of Examples 8-13, further comprising:

accessing, by the data receiver, one or more filters provided by an end user, wherein the storing includes storing only a filtered version of the first event information based on the one or more filters provided by the end user.

Example 15. A non-transitory machine-readable medium storing instructions which, when executed by one or more processors, cause the one or more processors to perform operations comprising:

receiving, at a first router microservice in a first monitoring application provider (MAP) located at a first data center, first event information regarding events occurring in an instance of a first monitored application provider belonging to a first tenant;
passing the first event information to a first message broker in the first MAP, the first message broker posting the first event information to a first topic and to a second topic;
the posting of the first event information to the first topic causing a first distributor microservice in the first monitoring application to send the first event information asynchronously to a second router microservice in a second MAP located in a second data center;
the posting of the first event information to the second topic causing a first data receiver in the first MAP to receive the first event information;
obtaining, by the first data receiver, tenant information regarding the first tenant from a service registry; and
storing, by the first data receiver, the first event information in a tenant-specific storage corresponding to the first tenant, in the first MAP, based on the tenant information.

Example 16. The non-transitory machine-readable medium of Example 15, wherein the first monitored application provider is a monitored line of business application provider (MLAP).

Example 17. The non-transitory machine-readable medium of Example 15 or 16, wherein the instance of the first monitored application provider is located at a third data center.

Example 18. The non-transitory machine-readable medium of Example 17, wherein the first data center is located at a geographically distant location to the third data center.

Example 19. The non-transitory machine-readable medium of any of Examples 15-18, wherein the first data center is located at a geographically distant location to the second data center.

Example 20. The non-transitory machine-readable medium of any of Examples 15-19, wherein the operations further comprise:

receiving, at the first router microservice in a first monitoring application provider (MAP) located at a first data center, from a second distributor microservice in the second MAP, second event information regarding events occurring in an instance of a second monitored application provider belonging to a second tenant;
passing the second event information to the first message broker, the first message broker posting the second event information to the second topic;
the posting of the second event information to the second topic causing the first data receiver to receive the first event information; and storing, by the first data receiver, the second event information in a tenant-specific storage corresponding to the second tenant, in the first MAP, based on the tenant information.

Figure 4:
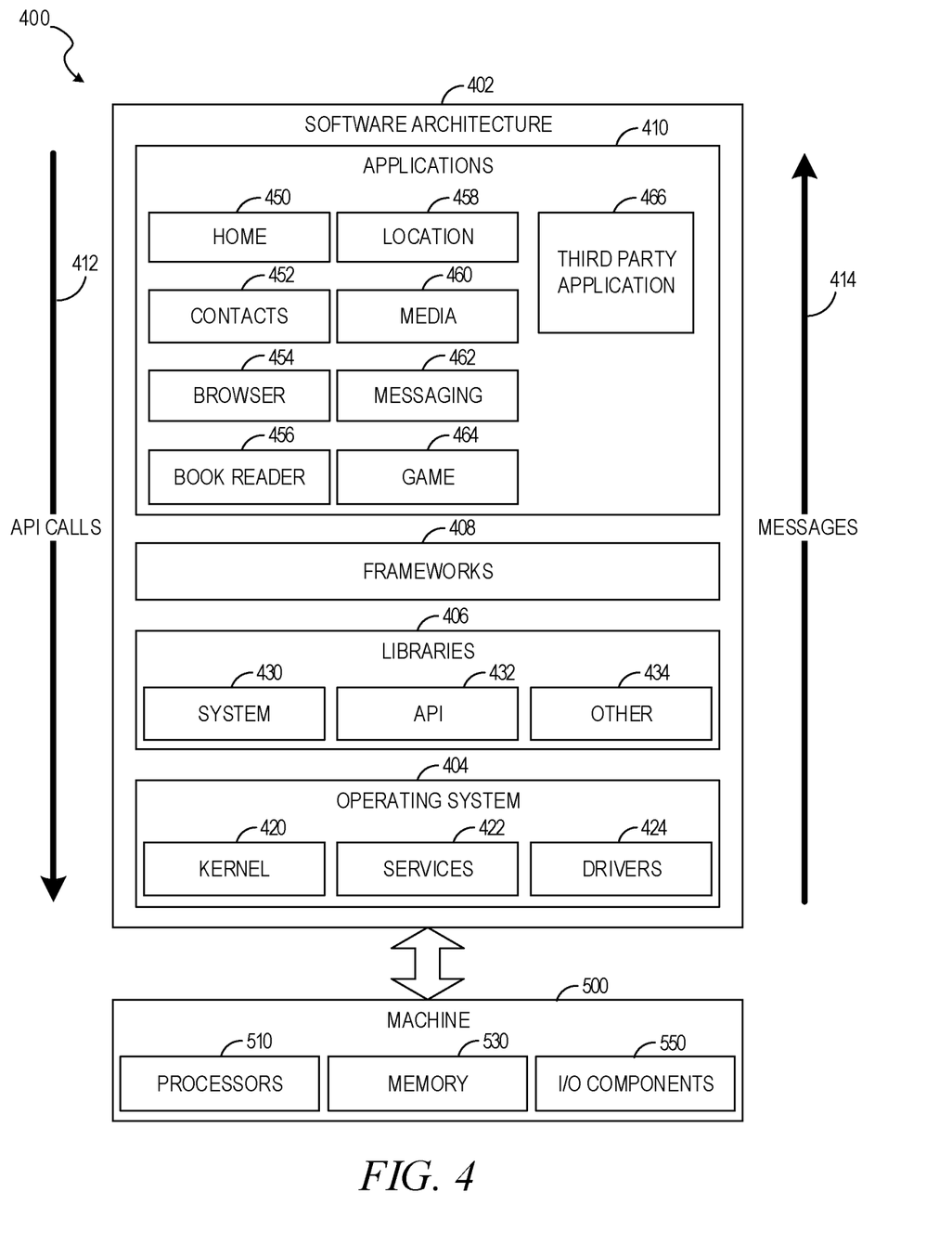
FIG. 4 is a block diagram illustrating an architecture of software, which can be installed on any one or more of the devices described above.

FIG. 4 is a block diagram 400 illustrating a software architecture 402, which can be installed on any one or more of the devices described above. FIG. 4 is merely a non-limiting example of a software architecture, and it will be appreciated that many other architectures can be implemented to facilitate the functionality described herein. In various embodiments, the software architecture 402 is implemented by hardware such as a machine 500 of FIG. 5 that includes processors 510, memory 530, and input/output (I/O) components 550. In this example architecture, the software architecture 402 can be conceptualized as a stack of layers where each layer may provide a particular functionality. For example, the software architecture 402 includes layers such as an operating system 404, libraries 406, frameworks 408, and applications 410. Operationally, the applications 410 invoke API calls 412 through the software stack and receive messages 414 in response to the API calls 412, consistent with some embodiments.

In various implementations, the operating system 404 manages hardware resources and provides common services. The operating system 404 includes, for example, a kernel 420, services 422, and drivers 424. The kernel 420 acts as an abstraction layer between the hardware and the other software layers, consistent with some embodiments. For example, the kernel 420 provides memory management, processor management (e.g., scheduling), component management, networking, and security settings, among other functionality. The services 422 can provide other common services for the other software layers. The drivers 424 are responsible for controlling or interfacing with the underlying hardware, according to some embodiments. For instance, the drivers 424 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 406 provide a low-level common infrastructure utilized by the applications 410. The libraries 406 can include system libraries 430 (e.g., C standard library) that can provide functions such as memory allocation functions, string manipulation functions, mathematic functions, and the like. In addition, the libraries 406 can include API libraries 432 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in 2 D and 3 D in a graphic context on a display), database libraries (e.g., SQLite to provide various relational database functions), web libraries (e.g., WebKit to provide web browsing functionality), and the like. The libraries 406 can also include a wide variety of other libraries 434 to provide many other APIs to the applications 410.

The frameworks 408 provide a high-level common infrastructure that can be utilized by the applications 410, according to some embodiments. For example, the frameworks 408 provide various graphical user interface (GUI) functions, high-level resource management, high-level location services, and so forth. The frameworks 408 can provide a broad spectrum of other APIs that can be utilized by the applications 410, some of which may be specific to a particular operating system 404 or platform.

In an example embodiment, the applications 410 include a home application 450, a contacts application 452, a browser application 454, a book reader application 456, a location application 458, a media application 460, a messaging application 462, a game application 464, and a broad assortment of other applications, such as a third-party application 466. According to some embodiments, the applications 410 are programs that execute functions defined in the programs. Various programming languages can be employed to create one or more of the applications 410, structured in a variety of manners, such as object-oriented programming languages (e.g., Objective-C, Java, or C++) or procedural programming languages (e.g., C or assembly language). In a specific example, the third-party application 466 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 466 can invoke the API calls 412 provided by the operating system 404 to facilitate functionality described herein.

Figure 5:
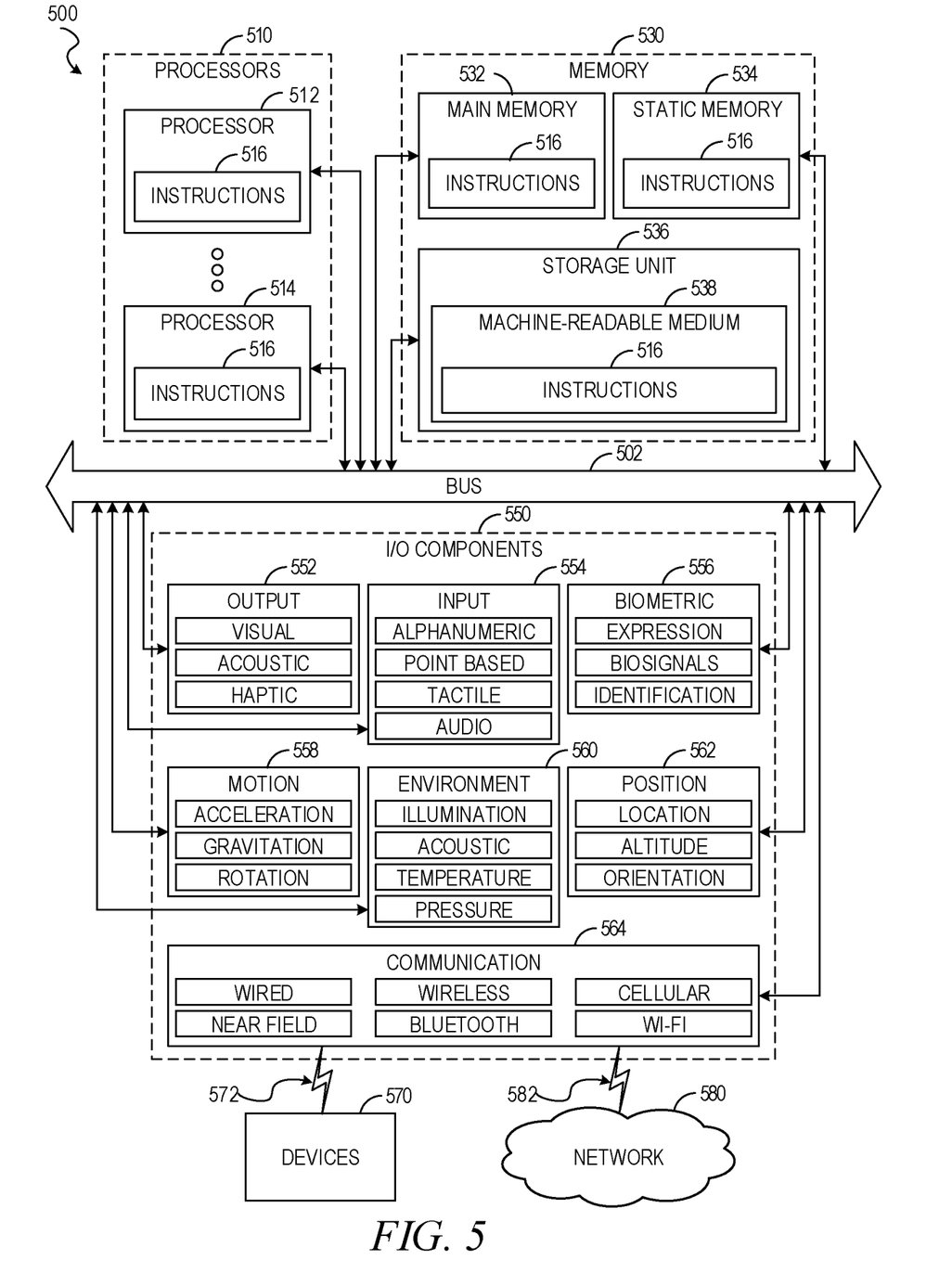
FIG. 5 illustrates a diagrammatic representation of a machine in the form of a computer system within which a set of instructions may be executed for causing the machine to perform any one or more of the methodologies discussed herein, according to an example embodiment.

FIG. 5 illustrates a diagrammatic representation of a machine 500 in the form of a computer system within which a set of instructions may be executed for causing the machine 500 to perform any one or more of the methodologies discussed herein, according to an example embodiment. Specifically, FIG. 5 shows a diagrammatic representation of the machine 500 in the example form of a computer system, within which instructions 516 (e.g., software, a program, an application, an applet, an app, or other executable code), for causing the machine 500 to perform any one or more of the methodologies discussed herein, may be executed. For example, the instructions 516 may cause the machine 500 to execute the methods of FIG. 3. Additionally, or alternatively, the instructions 516 may implement FIGS. 1-3 and so forth. The instructions 516 transform the general, non-programmed machine 500 into a particular machine 500 programmed to carry out the described and illustrated functions in the manner described. In alternative embodiments, the machine 500 operates as a standalone device or may be coupled (e.g., networked) to other machines. In a networked deployment, the machine 500 may operate in the capacity of a server machine or a client machine in a server-client network environment, or as a peer machine in a peer-to-peer (or distributed) network environment. The machine 500 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 516, sequentially or otherwise, that specify actions to be taken by the machine 500. Further, while only a single machine 500 is illustrated, the term "machine" shall also be taken to include a collection of machines 500 that individually or jointly execute the instructions 516 to perform any one or more of the methodologies discussed herein.

The machine 500 may include processors 510, memory 530, and I/O components 550, which may be configured to communicate with each other such as via a bus 502. In an example embodiment, the processors 510 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 512 and a processor 514 that may execute the instructions 516. The term "processor" is intended to include multi-core processors that may comprise two or more independent processors (sometimes referred to as "cores") that may execute instructions 516 contemporaneously. Although FIG. 5 shows multiple processors 510, the machine 500 may include a single processor 512 with a single core, a single processor 512 with multiple cores (e.g., a multi-core processor 512), multiple processors 512, 514 with a single core, multiple processors 512, 514 with multiple cores, or any combination thereof.

The memory 530 may include a main memory 532, a static memory 534, and a storage unit 536, each accessible to the processors 510 such as via the bus 502. The main memory 532, the static memory 534, and the storage unit 536 store the instructions 516 embodying any one or more of the methodologies or functions described herein. The instructions 516 may also reside, completely or partially, within the main memory 532, within the static memory 534, within the storage unit 536, within at least one of the processors 510 (e.g., within the processor's cache memory), or any suitable combination thereof, during execution thereof by the machine 500.

The I/O components 550 may include a wide variety of components to receive input, provide output, produce output, transmit information, exchange information, capture measurements, and so on. The specific I/O components 550 that are included in a particular machine will depend on the type of machine. For example, portable machines such as mobile phones will likely include a touch input device or other such input mechanisms, while a headless server machine will likely not include such a touch input device. It will be appreciated that the I/O components 550 may include many other components that are not shown in FIG. 5. The I/O components 550 are grouped according to functionality merely for simplifying the following discussion; the grouping is in no way limiting. In various example embodiments, the I/O components 550 may include output components 552 and input components 554. The output components 552 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 554 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 550 may include biometric components 556, motion components 558, environmental components 560, or position components 562, among a wide array of other components. For example, the biometric components 556 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 558 may include acceleration sensor components (e.g., accelerometer), gravitation sensor components, rotation sensor components (e.g., gyroscope), and so forth. The environmental components 560 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 562 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 550 may include communication components 564 operable to couple the machine 500 to a network 580 or devices 570 via a coupling 582 and a coupling 572, respectively. For example, the communication components 564 may include a network interface component or another suitable device to interface with the network 580. In further examples, the communication components 564 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 570 may be another machine or any of a wide variety of peripheral devices (e.g., coupled via a USB).

Moreover, the communication components 564 may detect identifiers or include components operable to detect identifiers. For example, the communication components 564 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 564, such as location via Internet Protocol (IP) geolocation, location via Wi-Fi® signal triangulation, location via detecting an NFC beacon signal that may indicate a particular location, and so forth.

The various memories (i.e., 530, 532, 534, and/or memory of the processor(s) 510) and/or the storage unit 536 may store one or more sets of instructions 516 and data structures (e.g., software) embodying or utilized by any one or more of the methodologies or functions described herein. These instructions (e.g., the instructions 516), when executed by the processor(s) 510, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including, by way of example, semiconductor memory devices (e.g., erasable programmable read-only memory (EPROM), electrically erasable programmable read-only memory (EEPROM), field-programmable gate array (FPGA), and flash memory devices), magnetic disks such as internal hard disks and removable disks, magneto-optical disks, and CD-ROM and DVD-ROM disks. The terms "machine-storage media," "computer-storage media," and "device-storage media," specifically exclude carrier waves, modulated data signals, and other such media, at least some of which are covered under the term "signal medium" discussed below.

In various example embodiments, one or more portions of the network 580 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 580 or a portion of the network 580 may include a wireless or cellular network, and the coupling 582 may be a Code Division Multiple Access (CDMA) connection, a Global System for Mobile communications (GSM) connection, or another type of cellular or wireless coupling. In this example, the coupling 582 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3 G, fourth generation wireless (4 G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 516 may be transmitted or received over the network 580 using a transmission medium via a network interface device (e.g., a network interface component included in the communication components 564) and utilizing any one of a number of well-known transfer protocols (e.g., Hypertext Transfer Protocol (HTTP)). Similarly, the instructions 516 may be transmitted or received using a transmission medium via the coupling 572 (e.g., a peer-to-peer coupling) to the devices 570. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 516 for execution by the machine 500, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
at least one hardware processor; and
a computer-readable medium storing instructions that, when executed by the at least one hardware processor, cause the at least one hardware processor to perform operations comprising:
  receiving, at a first router microservice in a first monitoring application provider (MAP) located at a first data center, first event information regarding events occurring in an instance of a first monitored application provider belonging to a first tenant;
  passing the first event information to a first message broker in the first MAP, the first message broker posting the first event information to a first topic and to a second topic;
  the posting of the first event information to the first topic causing a first distributor microservice in the first monitoring application to send the first event information asynchronously to a second router microservice in a second MAP located in a second data center;
  the posting of the first event information to the second topic causing a first data receiver in the first MAP to receive the first event information;
  obtaining, by the first data receiver, tenant information regarding the first tenant from a service registry; and
  storing, by the first data receiver, the first event information in a tenant-specific storage corresponding to the first tenant, in the first MAP, based on the tenant information.

2. The system of claim 1, wherein the first monitored application provider is a monitored line of business application provider (MLAP).

3. The system of claim 1, wherein the instance of the first monitored application provider is located at a third data center.

4. The system of claim 3, wherein the first data center is located at a geographically distant location to the third data center.

5. The system of claim 1, wherein the first data center is located at a geographically distant location to the second data center.

6. The system of claim 1, wherein the operations further comprise:
receiving, at the first router microservice in a first monitoring application provider (MAP) located at a first data center, from a second distributor microservice in the second MAP, second event information regarding events occurring in an instance of a second monitored application provider belonging to a second tenant;
passing the second event information to the first message broker, the first message broker posting the second event information to the second topic;
the posting of the second event information to the second topic causing the first data receiver to receive the first event information; and
storing, by the first data receiver, the second event information in a tenant-specific storage corresponding to the second tenant, in the first MAP, based on the tenant information.

7. The system of claim 1, further comprising:
accessing, by the data receiver, one or more filters provided by an end user wherein the storing includes storing only a filtered version of the first event information based on the one or more filters provided by the end user.

8. A method comprising:
receiving, at a first router microservice in a first monitoring application provider (MAP) located at a first data center, first event information regarding events occurring in an instance of a first monitored application provider belonging to a first tenant;
passing the first event information to a first message broker in the first MAP, the first message broker posting the first event information to a first topic and to a second topic;
the posting of the first event information to the first topic causing a first distributor microservice in the first monitoring application to send the first event information asynchronously to a second router microservice in a second MAP located in a second data center;
the posting of the first event information to the second topic causing a first data receiver in the first MAP to receive the first event information;
obtaining, by the first data receiver, tenant information regarding the first tenant from a service registry; and
storing, by the first data receiver, the first event information in a tenant-specific storage corresponding to the first tenant, in the first MAP, based on the tenant information.

9. The method of claim 8, wherein the first monitored application provider is a monitored line of business application provider (MLAP).

10. The method of claim 8, wherein the instance of the first monitored application provider is located at a third data center.

11. The method of claim 10, wherein the first data center is located at a geographically distant location to the third data center.

12. The method of claim 8, wherein the first data center is located at a geographically distant location to the second data center.

13. The method of claim 8, further comprising:
receiving, at the first router microservice in a first monitoring application provider (MAP) located at a first data center, from a second distributor microservice in the second MAP, second event information regarding events occurring in an instance of a second monitored application provider belonging to a second tenant;
passing the second event information to the first message broker, the first message broker posting the second event information to the second topic;
the posting of the second event information to the second topic causing the first data receiver to receive the first event information; and
storing, by the first data receiver, the second event information in a tenant-specific storage corresponding to the second tenant, in the first MAP, based on the tenant information.

14. The method of claim 8, further comprising:
accessing, by the data receiver, one or more filters provided by an end user, wherein the storing includes storing only a filtered version of the first event information based on the one or more filters provided by the end user.

15. A non-transitory machine-readable medium storing instructions which, when executed by one or more processors, cause the one or more processors to perform operations comprising:
receiving, at a first router microservice in a first monitoring application provider (MAP) located at a first data center, first event information regarding events occurring in an instance of a first monitored application provider belonging to a first tenant;
passing the first event information to a first message broker in the first MAP, the first message broker posting the first event information to a first topic and to a second topic;
the posting of the first event information to the first topic causing a first distributor microservice in the first monitoring application to send the first event information asynchronously to a second router microservice in a second MAP located in a second data center;
the posting of the first event information to the second topic, causing a first data receiver in the first MAP to receive the first event information;
obtaining, by the first data receiver, tenant information regarding the first tenant from a service registry; and
storing, by the first data receiver, the first event information in a tenant-specific storage corresponding to the first tenant, in the first MAP, based on the tenant information.

16. The non-transitory machine-readable medium of claim 15, wherein the first monitored application provider is a monitored line of business application provider (MLAP).

17. The non-transitory machine-readable medium of claim 15, wherein the instance of the first monitored application provider is located at a third data center.

18. The non-transitory machine-readable medium of claim 17, wherein the first data center is located at a geographically distant location to the third data center.

19. The non-transitory machine-readable medium of claim 15, wherein the first data center is located at a geographically distant location to the second data center.

20. The non-transitory machine-readable medium of claim 15, wherein the operations further comprise:
receiving, at the first router microservice in a first monitoring application provider (MAP) located at a first data center, from a second distributor microservice in the second MAP, second event information regarding events occurring in an instance of a second monitored application provider belonging to a second tenant;
passing the second event information to the first message broker, the first message broker posting the second event information to the second topic;
the posting of the second event information to the second topic, causing the first data receiver to receive the first event information; and
storing, by the first data receiver, the second event information in a tenant-specific storage corresponding to the second tenant, in the first MAP, based on the tenant information.

* * * * *